Figure 1:
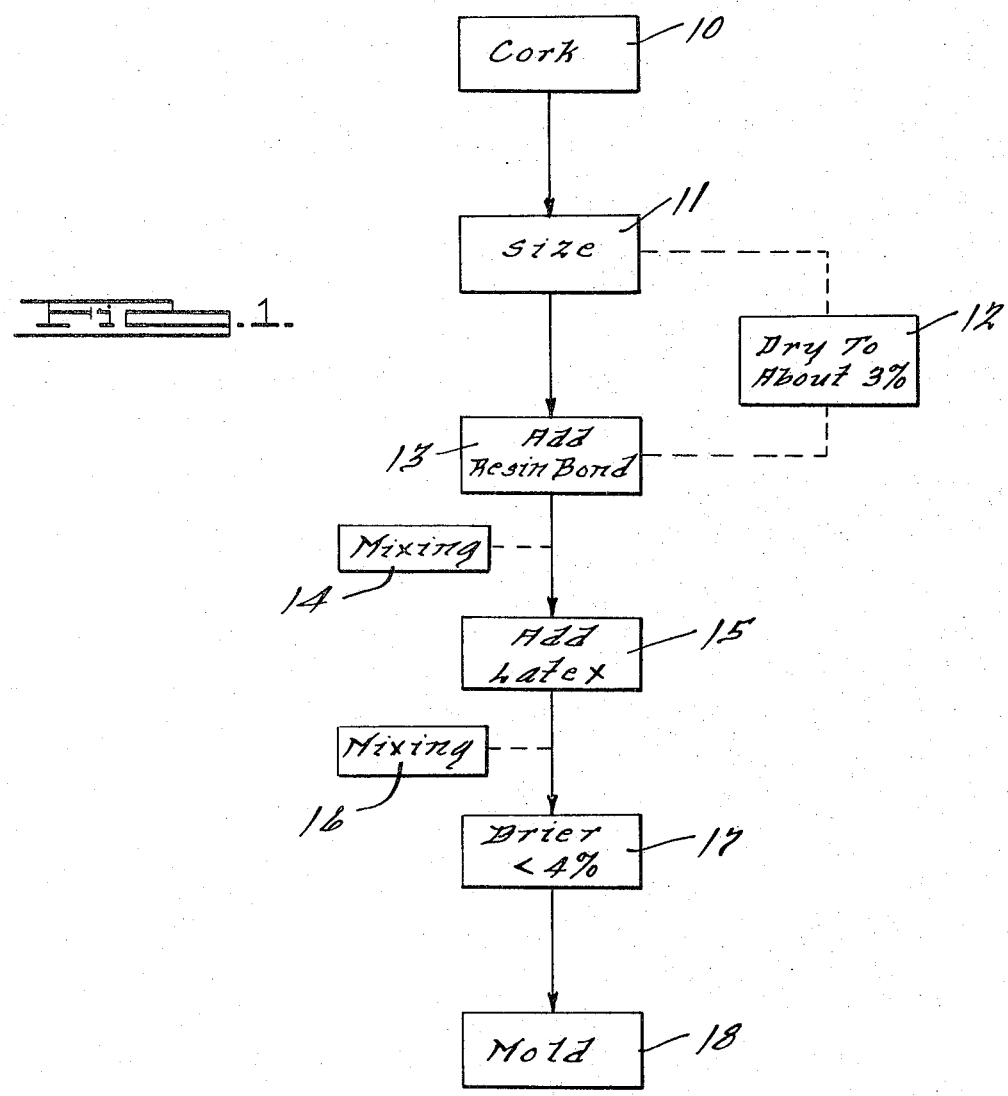

INVENTORS
Richard H. Hawkes,
Marvin M. Spruill.
BY
ATTORNEYS.

3,313,872
METHOD OF PRODUCING CORK GASKETS
Richard H. Hawkes and Marvin M. Spruill, Norfolk, Va., assignors to Sheller Manufacturing Corporation, Detroit, Mich., a corporation of Indiana
Filed Dec. 10, 1964, Ser. No. 417,357
5 Claims. (Cl. 264—118)

This invention relates to a method for producing cork gaskets, and particularly to gaskets made from granulated cork bonded by a synthetic latex composition.

The present invention pertains to preparing gaskets and to the method of construction to produce seals for oil pans, rocker arm covers, valve push rod covers for automotive use, and the like. It was found that when a specific quantity of latex is dispersed throughout the shredded cork and adhesive compound that the gasket has a greater resistance to the passage of oil especially high detergent oils experienced in heated automotive engines. By the use of a suitable thermosetting resin, preferably plasticised, in combination with latex the resulting cork gasket will be provided with a desirable bonding strength and a resiliency which will have a control compressibility to the quality level desired. The composition is formed by first granulating the cork particles to a specific size and thoroughly drying the particles. The bonding and adhesive substance is then applied to the granules either by spraying, pouring or other suitable method, thoroughly agitating the mixture. Thereafter the latex is added to the mixture by pouring, spraying or the like and the coated granules are again thoroughly agitated to insure a uniform mixture. The mixture is then dried to reduce the moisture content to less than about 4% by weight of water and deposited in a mold and compressed to a predetermined density and cured by heat. The completed cork board, for example, may be 3½ inches thick by 37 inches long and 25 inches wide and is thereafter sliced to produce gaskets of predetermined thickness.

The main objects of the invention are: to provide a method of preparing an improved gasket made of granulated cork bonded by a suitable adhesive containing latex as a blocking agent; to provide a resilient gasket which is impervious to the passage of hot detergent oils; to provide an improved gasket of bonded granular cork particles containing a latex which is impervious to oil and provides a predetermined resiliency to the resulting gasket; to provide an improved resilient gasket of granulated cork which is thoroughly dried to prevent shrinkage and to have a control degree of compressibility to a desired quality level; and, in general, to provide a cork gasket which is simple and inexpensive of construction, which is impervious to passage of liquids therethrough and which is economical of manufacture.

Figure 2:
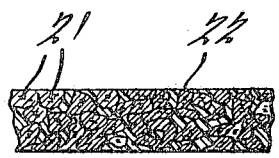

Other objects and features of novelty of the invention will be specifically pointed out or will become apparent when referring, for a better understanding of the invention, to the following description taken in conjunction with the accompanying drawing, wherein:

FIGURE 1 is a schematic view illustrating the process of producing granulated cork rubber bond gaskets of the present invention, and FIGURE 2 is an enlarged broken sectional view of a gasket showing granulated cork and the bonding and blocking material surrounding the granules thereof.

In constructing a gasket in accordance with the present invention, cork particles as illustrated in 10 in FIG. 2 are granulated to a desired size, as illustrated at 11, and then dried to approximately 3% or less of water by weight as illustrated at 12. The granules are of any commercially usable size such as 5/10, 10/20, 20/40, or larger. To a predetermined amount of the dried cork granules, as illustrated at 13, a predetermined amount of thermosetting resin having a plasticizer therein is added by spraying, pouring, or the like, and thoroughly mixed, as illustrated at 14. The thermosetting resin which is employed and may be any one of the following: phenolaldehyde resins, urea-formaldehyde resins, resorcinol resins, epoxy resins, protein adhesives, polyurethane polymers and fluid neoprene or buna polymers, and preferably is a phenol-formaldehyde resin. Such materials cannot only be used alone but a blending thereof would yield satisfactory adhesive properties. Any or all of the polyhydroxy compounds of the glycol family can be used as the plasticizer; for cost purposes, it is possible to reduce the glycol content and substitute small amounts of petroleum oils. A small amount of petroleum oil, less than 1%, is desirable in the mixture to assist in the slicing operation to produce gaskets of predetermined thickness from the molded board.

After the mixture is properly agitated, a predetermined amount of latex is then added, as illustrated at 15, and the composition thus produced is further agitated, as illustrated at 16, until the materials are uniformly mixed. Thereafter the mixture is dried, as illustrated at 17, on a belt drier or the like, to a moisture content less than about 4% by weight so as to avoid excessive shrinkage on subsequent curing. The composition material is now ready to be molded and is placed in the mold cavity and filler frame as illustrated at 18. After the compostion material is compressed and locked in the mold, a 3½ inch thick board should be baked for eight hours at 300° F. The time of heat will vary with the thickness of the board which is being molded, but is selected to insure that the resin employed is thermoset.

Upon completion of the baking period, the mold is removed from the oven and cooled until there is no measurable swell of the cork board when removed from the mold such as, for example, approximately 12 hours for a typical mold. The cork board is then ready for splitting into sheets, as illustrated in FIG. 2 and processed into gaskets of predetermined shape and size.

The cork material of this invention has particular use as gaskets for oil pans, rocker arm covers and valve push rod covers, and the like. The gasket thus constructed has a compressibility of 20% to 45% under 100 p.s.i. load with a tensile strength of at least 120 p.s.i. It was found the material will not break or separate when bent slowly 180° around a mandrel having a diameter of five times the thickness of the gasket and that the gasket is impervious to the passage of hot detergent oil.

One precise example of the mixture for a cork board of the present invention would be that employing 36 pounds of Catabond No. 9580 and 54 pounds of plasticizer glycerine, which when mixed together, forms the binder for the 300 pounds of cork granules which have been dried. After being thoroughly mixed, 20 pounds of Hycar Latex 1572 as the blocking agent is added and agitation is continued until the materials are thoroughly mixed. Approximately 4 pounds of petroleum oil is added to the mixture as a lubricant to assist in the slicing operation. The mixed material is placed in the mold which is heated to 300° F. for a period of 8 hours for a 3½ inch board, and as pointed out hereinabove, less time will be required for thinner boards. Thereafter the mold is cooled for a period of approximately 12 hours.

The Catabond 9580 is employed with the plasticizer as an adhesive, and is phenolic-formaldehyde resin in water solution obtainable from Catalin Corporation of America, One Park Avenue, New York 16, N.Y. The Hycar Latex 1572, which is employed as a blocking agent and also as an accessory binder, is obtainable from B. F. Goodrich Chemical Co., 3135 Euclid Avenue, Cleveland 15, Ohio. This is a carboxyl modified medium high acrylonitrile content latex, is a collodial suspension of individual spherical particles of butadieneacrylonitrile copolymer in water with sufficient conventional rubber antioxident added for normal aging conditions. A high gravity glycerine is preferred as a plasticizer and can be procued from Proctor & Gamble of Cincinnati, Ohio. This is used as a plasticizing and stabilizing agent in the manufacturing of the cork composition.

While a specific example has been set forth above, it is to be understood that any thermosetting type adhesive may be used that will permit the cork composition to be boiled into concentrated hydrochloric acid for a period of 30 minutes and have a tensile strength of at least 120 p.s.i. To this may be added any plasticizer or combination of plasticizers or softening agents or any type which would lend dimensional stability within the commercially allowable tolerances such as the glycol family of chemicals and modified petroleum oils. The blocking agent may be any synthetic polymer having oil, fuel and solvent resistant characteristics when applied in sufficient quantity to perfom the service of blocking within the compound. Its accessory binding capacity is not important so long as it does not deteriorate the adhesive characteristics of the primary binder which gives or should be capable of providing the necessary tensile strength. Such blocking agents are neoprene latex; GRS latex, nitrile latex, vinyls, acetates and any other plastic capable of being cured to a flexible film state. It is to be understood however, that by employing the various raw materials, a departure from the percentages prescribed in the particular formula might be necessary to yield the desired physical characteristics in the cork board produced.

Depending upon the degree of blocking and resiliency desired in the final gasket material, it is suitable to vary the proportions of the resin glycerin blocking agent and oil components, set forth above in the specific example, to the following, in weight percent:

| | Percent |
|---|---|
| Cork | 69.5–76 |
| Thermosetting binding agent | 6–10.6 |
| Glycerin | 10.5–15.7 |
| Blocking agent | 3.9–5.8 |
| Oil | 0.7–1.2 |

As is evident from FIG. 2, the cork grannules 21 are thoroughly coated with the binding and blocking material 22, which fills the interstices between the granule and thereby prevent any liquids passing through the granules or therearound and through the resulting gasket sheet. The ordinary resin binders are not capable of blocking hot detergent oils which are capable of passing therethrough. When the blocking agent is added to the binding agent all of the surface of the granular particles 21 and the area therebetween is blocked to the passage of such hot detergent oils.

What is claimed is:

1. The method of producing a cork gasket from a granulated cork of commercially usable granular size which includes the steps of: mixing a binder composed of 16.5–26.3% of a thermosetting resin containing glycerine as a plasticizer, thoroughly mixing the binder with 69.5–76% by weight of cork granules and adding to the mixture 3.9–5.8% of a blocking agent, continuing the mixing of said mixture and thereafter placing said mixture in a mold where said mixture is heated to approximately 300° F. for a substantial length of time.

2. The method of producing a cork gasket from granulated cork which includes the steps of: granulating cork of commercially usable granular size, mixing a binder composed of thermosetting resin containing glycerine as a plasticizer, thoroughly mixing the granules and binder, adding to the mixture a latex for a blocking agent and a small amount of petroleum oil, continuing the mixing of said mixture and thereafter placing said mixture in a mold where said mixture is heated to approximately 300° F. for a substantial period of time to form a molded board and thereafter cooling the mold and molded board for a further period of time.

3. The method of producing a cork gasket from granulated cork which includes the steps of: granulating cork of commercially usable granular size, mixing approximately 90 pounds of a binder composed of a thermosetting resin containing glycerine as a plasticizer with approximately 300 pounds of the cork granules, thoroughly mixing the granules and binder, adding 20 pounds of latex thereto as the mixing is continued, placing the mixed material in a mold which is heated to approximately 300° F., to form a molded board, for a time depending upon the thickness of the board being formed in the mold, cooling the mold for a substantial time at least until no measurable swell of the cork board will be apparent, and thereafter slicing said board into desired thicknesses for gaskets.

4. The method of constructing a granulated cork gasket which includes the steps of: granulating the cork to desired size, drying said granules to approximately 3% by weight of water, to approximately 69.5–76% by weight of the cork granules, adding 16.5–26.3% of thermosetting resin binder and plasticizer, thoroughly mixing the binder and plasticizer with the cork granules, adding 3.9–5.8% of a blocking agent, thoroughly mixing the blocking agent with the binder, plasticizer, and the cork granules, drying the mixture to reduce the moisture content to less than 4% by weight of water and thereafter molding a sufficient quantity of said mixed material in a mold to produce a cork board having a desired density.

5. The method of constructing a granulated cork gasket from cork granules of a predetermined desired size which includes the steps of: adding about 16.5–26.3% of thermosetting resin binder and plasticizer to approximately 69.5–76% by weight of the cork granules, thoroughly mixing the binder and plasticizer with the cork granules, adding 3.9–5.8% of a blocking agent, thoroughly mixing the blocking agent with the binder plasticizer and the cork granules, and thereafter molding a sufficient quantity of said mixed material in a mold to produce a cork board having a desired density.

References Cited by the Examiner

UNITED STATES PATENTS

| 2,672,650 | 3/1954 | Westerberg | 18—5 |
| 3,101,243 | 8/1963 | Hawkes | 264—109 |

ROBERT F. WHITE, *Primary Examiner.*

J. R. HALL, *Assistant Examiner.*